United States Patent [19]

Staples

[11] Patent Number: 5,730,772
[45] Date of Patent: Mar. 24, 1998

[54] HIGH NITROGEN DRIED POULTRY MANURE FERTILIZER

[75] Inventor: David E. Staples, Lake Mills, Wis.

[73] Assignee: Creekwood Farms Incorporated, Lake Mills, Wis.

[21] Appl. No.: 764,850

[22] Filed: Dec. 13, 1996

[51] Int. Cl.$^6$ .................... C05F 11/08; C05F 3/00
[52] U.S. Cl. ........................ 71/9; 71/15; 71/21
[58] Field of Search ................... 71/8, 9, 11, 12, 71/15, 21

[56] References Cited

U.S. PATENT DOCUMENTS

| | | | |
|---|---|---|---|
| 3,718,451 | 2/1973 | Baumann | 71/9 |
| 3,773,659 | 11/1973 | Carlson et al. | 210/606 |
| 3,939,280 | 2/1976 | Karnemaat | 426/2 |
| 4,088,796 | 5/1978 | Persson | 426/641 |
| 4,193,786 | 3/1980 | Brill | 71/9 |
| 4,218,233 | 8/1980 | Hackett | 71/9 |
| 4,292,328 | 9/1981 | Coulthard et al. | 426/2 |
| 4,752,316 | 6/1988 | Plovanich et al. | 71/9 |
| 4,813,996 | 3/1989 | Gardner et al. | 71/21 |
| 4,909,825 | 3/1990 | Eigner | 71/9 |
| 5,411,567 | 5/1995 | Ueotani et al. | 71/9 |
| 5,417,736 | 5/1995 | Meyer | 71/9 |
| 5,584,904 | 12/1996 | Dalos | 71/9 |

*Primary Examiner*—Ferris Lander
*Attorney, Agent, or Firm*—Reinhart, Boerner, Van Deuren, Norris & Rieselbach, s.c.

[57] ABSTRACT

A method of preparing a dried fertilizer composition from poultry manure, minimizing decomposition and degradation of organic nitrogen, to achieve a total nitrogen content of about 3 to about 7 percent by weight.

22 Claims, 4 Drawing Sheets

HIGH NITROGEN DRIED POULTRY MANURE FERTILIZER

This invention relates generally to fertilizer compositions prepared from poultry manure, and more specifically, a high-nitrogen dried fertilizer composition and method of preparation from poultry manure.

Poultry manure has long been used as a material to enhance soil productivity. Poultry manure advantageously contains organic protein, inorganic nitrogen, fiber and minerals. For reasons related to animal husbandry, the manure is frequently available as a mixture with straw and/or other bedding materials, and suitable for use as a soil conditioner.

Prior use of poultry manure as a fertilizer material has been somewhat restricted by low nitrogen content and the often accompanying malodor. Preparation of the raw manure invariably leads to unwanted decomposition and loss of nitrogen. Malodor is not surprising and something of a byproduct of the decomposition process. Other drawbacks to wider use of this material as a fertilizer are evident from an overview of the prior art.

An animal feed supplement is disclosed in U.S. Pat. No. 3,939,280. While not directed to a fertilizer composition, it references use of poultry manure as a soil enriching agent and an incumbent nitrogen content of 3% to 4%. Typically, however, fertilizer compositions contemporary with that described herein have nitrogen contents on the order of about 2%.

A fertilizer/soil conditioner prepared from chicken manure is described in U.S. Pat. No. 3,718,451. The material is formulated by combining it with a urea-formaldehyde foam resin. While the material is described as imparting a 15% assimilable nitrogen content, it does so only by use of a resin which has since fallen into environmental disfavor because of the formaldehyde component. Likewise, U.S. Pat. No. 4,193,786 describes the high nutrient value available from a composting mixture of animal manure and sawdust. Such a filler material is necessary to achieve the desired structural characteristics and remedy the degradation of nitrogen content during composting.

U.S. Pat. No. 4,292,328 describes a thermophilic aerobic digestion process for producing proteinaceous materials suitable for animal feed, from the manure of those animals including poultry. Continuous use of an oxygenating gas and maintenance of mesophilic microbiological temperatures serves to digest the raw material to the extent desired. Digestion, however, involves the degradation of organic materials and, invariably, the loss of nitrogen content. Fortuitously, the method described includes the utilization of atmospheric nitrogen to account for digestive losses. Mother process and apparatus for conditioning chicken manure is described in U.S. Pat. No. 4,909,825. More particularly, the disclosed method requires use of pre-formed particulate carders of thermoenergy and microorganisms for the processing of raw manure. The process parameters disclosed necessitate a decomposition with inherent loss of nutrient value. In U.S. Pat. No. 4,218,233 such a concern is addressed, along with the odor problem which often accompanies any poultry process. This reference describes use of biologically-active cow manure as a source of aerobic thermophilic bacteria to inoculate poultry excrement to control odor and prevent nitrogen loss through lower ammonia production.

BRIEF DESCRIPTION OF THE DRAWINGS

FIG. 1A, NATURALL 8-1-3; FIG. 1B, LAWN FIXER 9-2-1; FIG. 1C, CREEKWOOD 3-4-3; FIG. 1D, MILORGANITE 6-2-0; and FIG. 1E SUSTANE 5-2-4.

SUMMARY OF THE INVENTION

Figure 1B:
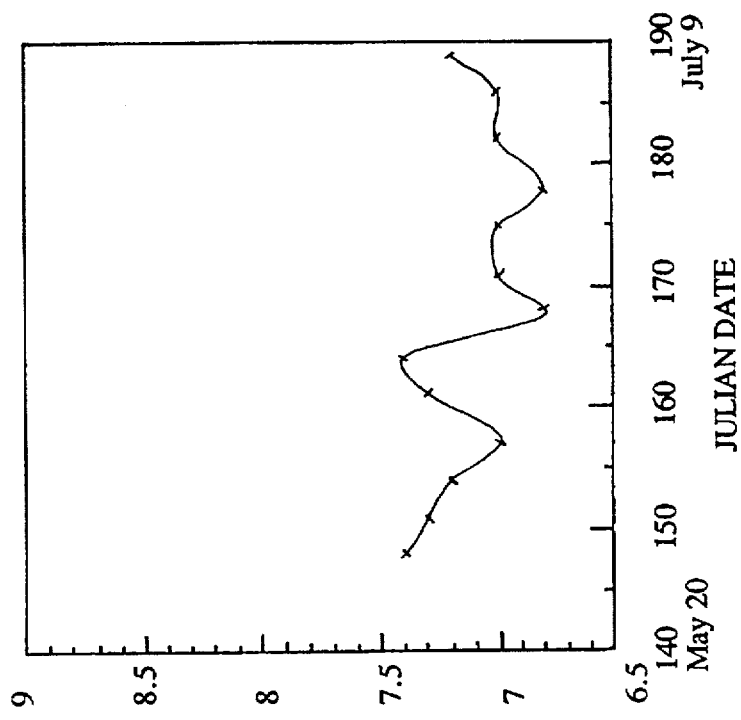
FIGS. 1A–1E show graphically the color responses of several commercial (N-P-K) fertilizer compositions (reference Table 1 for those and other such products), by way of comparison with an embodiment of the present invention having a stabilized nitrogen content and available under the CREEKWOOD 3-4-3 trade designation.
Figure 1A:
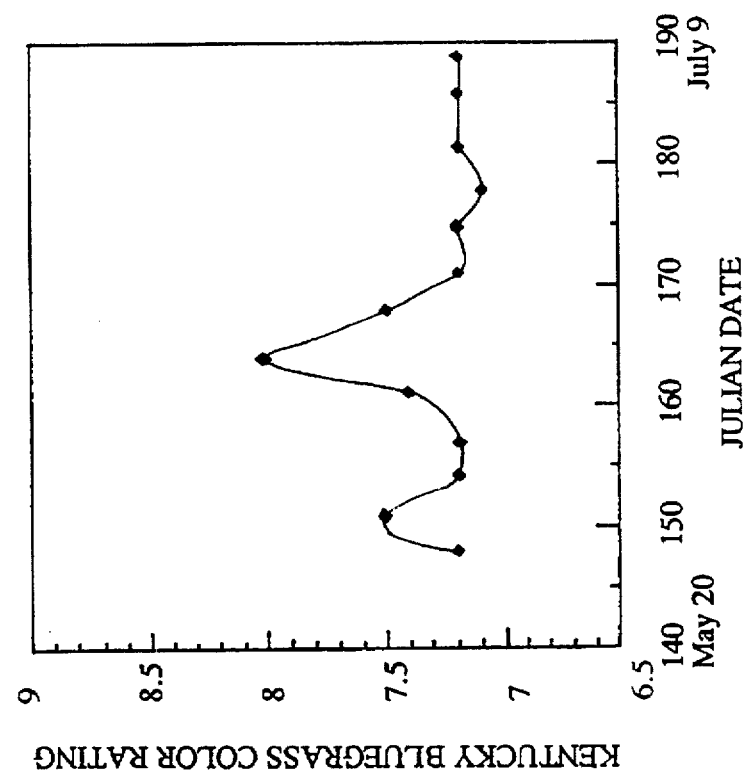
Figure 1D:
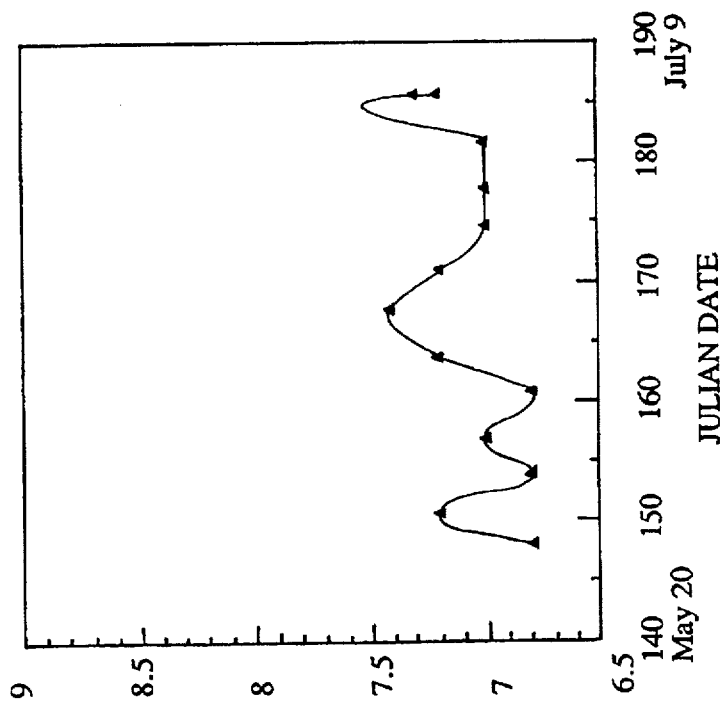
Figure 1C:
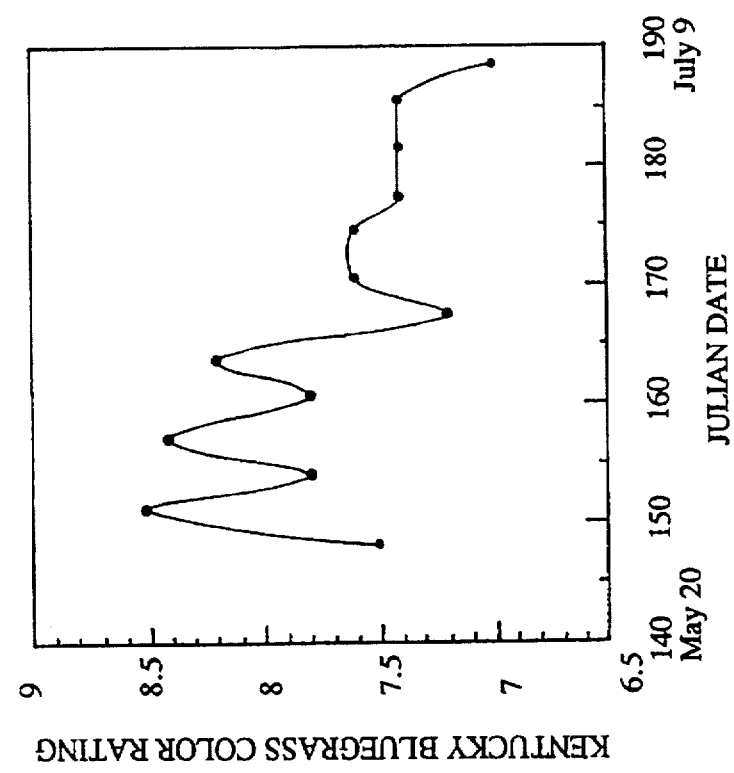
Figure 1E:
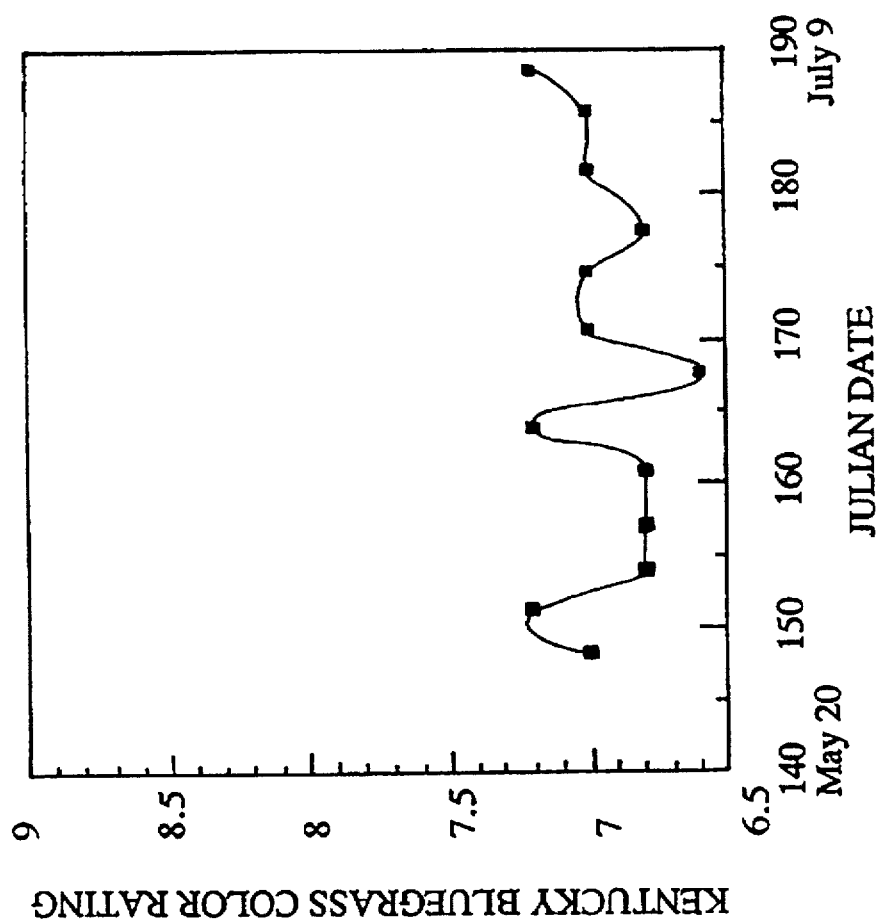

There are a considerable number of problems and deficiencies associated with dried fertilizer compositions prepared from poultry manure-irrespective the particular method or technique utilized for preparation. There is a demonstrated need for a methodology toward fertilizer materials and/or compositions having a high nitrogen content, which can be used to achieve demonstrable effect in the area of plant program development.

Accordingly, it is an object of the present invention to provide fertilizer compositions prepared from poultry manure and methods for their preparation, thereby overcoming various deficiencies and shortcomings of the prior art, including those outlined above. It will be understood by those skilled in the art that one or more aspects of this invention can meet certain objectives, while one or more other aspects meet certain other objectives. Each objective may not apply equally, in all instances, to every aspect of the invention. As such, the following objects-in light of the prior art regarding dried poultry manure fertilizer compositions-can be viewed in the alternative with respect to any one aspect of the present invention.

It can also be an object of the present invention to provide for a composition derived from poultry manure, the composition having a high nitrogen content as compared to composted materials of the prior art, with the nitrogen content relatively unsusceptible to hydrolysis and available over time for plant growth and development.

It can also be an object of the present invention to provide a dried poultry manure fertilizer material having a stable, slow-release nitrogen component without necessary resort to additives or polymeric binders.

It can also be an object of the present invention to provide for a composition derived from poultry manure, such a composition having a high nitrogen content as compared to materials of the prior art, without adding extraneous sources of nitrogen, and sawdust or like carbonaceous fillers.

It can also be an object of the present invention to provide for a method and dried poultry manure fertilizer composition derived therefrom which avoids composting and the degradation of nitrogenous components inherent to composting.

It can also be an object of the present invention to provide a dried poultry manure fertilizer composition with a nitrogen content that is stabilized and/or fixed in a chemical and/or physical form which is relatively water insoluble and which releases over time.

The compositions and/or methods of the present invention can suitably comprise, consist of, or consist essentially of various elements and/or components, including those specifically described herein. Each such composition and/or method is distinguishable, characteristically contrasted, and can be practiced in conjunction with the present invention separate and apart from another. Accordingly, it should be understood that the inventive compositions and/or methods, as illustratively discussed herein, can be prepared and/or practiced in the absence of any one component, species and/or step which may or may not be specifically disclosed, referenced or inferred herein, the absence of which may or may not be specifically disclosed, referenced or inferred herein.

Other objects, features and advantages of the present invention will be apparent from this summary and the following examples, especially so to those skilled in the art having knowledge of the preparation of fertilizer preparations from poultry manure. Such objects, features, benefits and advantages would be apparent from the above as taken in conjunction with the accompanying Examples, tables, data and all reasonable inferences to be dram therefrom.

In part, the present invention is a method of preparing a dried fertilizer composition from poultry manure. The method includes (1) providing excremented poultry manure, (2) aerating the manure at a rate and for a time sufficient to achieve a total nitrogen content of about 7.0 to about 8.5 percent by weight of the manure, (3) cultivating and/or treating the manure to reduce the moisture content to about 20 to about 45 percent by weight, and (4) maintaining the manure for a time and at a temperature sufficient to sterilize the manure and achieve a total nitrogen content of about 3.0 to about 7.0 percent by weight of the manure. The inventive method can also include molding the manure. In preferred embodiments, such molding can be conducted at a temperature and pressure sufficient to provide the manure a moisture content of about 15.0 to about 26.0 weight percent of the manure. Where such molding is contemplated, a temperature of about 350° F. to about 550° F. can be utilized effectively to achieve the desired compositional qualities. Pressures of about 2,000 pounds per square inch to about 2,500 pounds per square inch can be used with such temperature parameters.

More particularly and in conjunction with preferred embodiments, the aeration used with the present invention can be conducted at a rate of about 400 to about 800 cubic feet per minute. Alternatively and as can be used with preferred embodiments, the aeration can be conducted at a rate of about 4 cubic feet per minute per individual bird of a poultry species.

Likewise and with preferred embodiments, the manure can be treated and/or cultivated at a temperature of about 90° F. to about 120° F. Temperature is also a consideration in maintaining the manure and achieving a total nitrogen content characteristic of this invention. Preferred embodiments, the manure's maintained at a temperature of about 130° F. to about 150° F. With highly preferred embodiments, alone or in conjunction with various other process parameters, such a temperature is maintained for a period of about 24 hours to about 168 hours. Such preferred embodiments can include molding of the sort discussed above.

In part, the present invention is a dried poultry fertilizer composition with a total nitrogen content of about 3.0 weight percent to about 7.0 weight percent. The composition is obtainable by aerating freshly excremented poultry manure at a rate of about 400 cubic feet per minute to about 800 cubic feet per minute for a period of about two days to about four days, with cultivating the manure at an ambient temperature of about 75° F. to about 120° F. and maintaining the manure at a temperature sufficient to deactivate residual weed seeds and pathogens. In preferred embodiments of this invention, the aeration can be conducted by a rate of about 600 cubic feet per minute.

In part, the present invention is a dried poultry fertilizer composition having a total nitrogen content of about 3.0 weight percent to about 7.0 weight percent and providing a late season Kentucky bluegrass color rating of about 7.5 after application equivalent to 1.0 pounds of nitrogen per 1,000 square feet of turf. Such a color rating is well known to those skilled in the art and the rating achievable as described herein would be understood by those individuals made aware of the present invention. Such a composition is obtainable by aerating freshly excremented poultry manure at a rate of about 400 cubic feet per minute to about 800 cubic feet per minute for a period of about two days to about four days, with cultivating the manure at an ambient temperature of about 75° F. to about 120° F. and maintaining the manure at a temperature sufficient to deactivate residual weed seeds and pathogens. In preferred embodiments thereof, the maintained manure can be molded as described above.

In part, the present invention is also a method of controlling the rate of release of a nitrogen component of a poultry fertilizer composition. The method includes (a) providing a freshly excremented poultry manure; (b) fixing the nitrogen component of the manure by (i) aerating the manure at a rate and for a time sufficient to achieve a total nitrogen content of about 7.0 to about 8.5 percent by weight of the manure, (ii) cultivating the manure to reduce the moisture content to about 20 to about 45 percent by weight of the manure, and (iii) maintaining the manure for a time and at a temperature sufficient to sterilize the manure and achieve a total nitrogen content of about 3.0 to about 7.0 percent by weight of the manure; and (c) introducing the maintained manure to a growth medium. Under indigenous conditions the nitrogen component of the maintained manure is made available for plant growth and development. In preferred embodiments, the aeration, cultivation and maintenance perimeters of this invention can be as described above in order to achieve the rate of nitrogen component release observed through use of this invention. In preferred embodiments, control over the rate of release can further include molding the maintained manure at a temperature and pressure sufficient to reduce the moisture content of the manure to about 15.0 weight percent to about 26.0 weight percent.

As described above, freshly excremented poultry manure is immediately dried. In preferred embodiments, the manure is derived from commercial egg layers fed diets designed to complement the desired fertilizer composition. Typically and without limitation, the diet can be designed to impart lower phosphorous levels to the manure and, ultimately, the final fertilizer product. Phosphorous levels at about 5 percent by weight are desirable from an environmental standpoint and achievable through use of the present invention.

After a period of time, the dried manure is gathered and cultivated for a time and at a temperature sufficient to further reduce the moisture content, without compromising nitrogen levels. The manure is then maintained at a temperature and for a time sufficient to sterilize the material and deactivate various pathogens present, including coliform and salmonella bacteria, viruses, worms and larvae. The material can then be processed through a mill to provide a pellet form which, when properly cured and dried, is stable for subsequent packaging and marketing. The aeration, cultivation and maintenance elements of the present invention, together with a subsequent milling operation, work to fix and/or stabilize the initial nitrogen component of the manure, minimize its loss, and provide it in a form which will be slowly released to a growth medium for subsequent plant development. It should be understood that reference to nitrogen fixation, in the present context, does not include incorporation of atmospheric nitrogen such as that observed with legumes, but refers to the chemical and/or physical transformation of the nitrogen component in such a way as to stabilize it against undue degradation, render it less water soluble, and impart a slow-release quantity.

Without adopting any one theory or mode of operation, it is believed that the nitrogen component of such a fertilizer is, at least, in part responsible for enhanced green color observed through use of the present invention. By way of comparison, similar fertilizers of the prior art can contain only urea as a nitrogen source. Urea is very water soluble and, as such, evokes a quick color response when applied to turf grass. On the other hand, urea is also very susceptible to hydrolysis and microbial activity, such that the resulting release of ammonia can induce burn spots and overall reductions in turf quality.

In contrast, the present invention provides a relatively high nitrogen content in a form which is released slowly so that it will not burn plants. The resulting fertilizer composition is entirely organic, without fillers, harmful chemical additives, or heavy metal compounds. It is environmentally safe, and does not have an offensive odor. It provides desirable micro-nutrients to the soil and increases water retention capacity and level of aeration. A fertilizer composition consistent with the present invention is available under the Creekwood trademark from Creekwood Farms, Inc. of Lake Mills, Wis. More specifically and in accordance with the present invention, this commercial material provides a phosphorous nutrient (approximately 5 weight percent) to enhance root growth and increase nitrogen utilization, and soluble potash (approximately 3 weight percent) to improve stalk strength, winter hardiness and disease resistance. As with phosphorous and potash, the calcium level (approximately 8 weight percent) is a manifestation of poultry diet; in particular, such a calcium level operates to facilitate root and leaf growth, cell development and overall plant health.

Freshly excremented chicken manure contains about 80% to 90% (by weight) water and has a nitrogen content greater than about 15 to 24 weight percent. It is extremely malodorous and, typically, not used as a fertilizer composition until after processing. As mentioned above, the present invention can utilize a drying function immediately after dropping, as an initial step to inhibit degradation of the nitrogenous components. In such embodiments, various mechanisms can be utilized, as would be known to those skilled in the art and made aware of this invention. Preferably, a plurality of wisk fans are utilized under or in conjunction with a cage configuration. Such fans and/or their mechanical equivalent can move either ambient or introduced air over the excrement to reduce the water content to less than 50 weight percent and stabilize the nitrogen content at about 7 to about 8.5 weight percent. The time needed is dependent upon ambient air temperature, relative humidity and the rate of aeration. Preferably, with an ambient air temperature of about 75° to 80° F. and a relative humidity of about 60% to about 70% and depending upon seasonal variations, the rate of aeration is about 400 to about 800 cubic feet per minute. Alternatively, the aeration can be at a rate of about 4 cubic feet per second per bird. The rate of aeration required to achieve the desired degree of nitrogen stabilization will also vary with ambient air temperatures and relative humidity. Without limitation or adopting any one theory or mode of operation, the reduction of the water content to the observed levels may serve to inhibit microbiological activity and prevent undue loss of nitrogen.

The aerated manure can then be treated under mildly aerobic conditions to effect further reductions in water content, with only minimal loss of nitrogen. Where prior aeration has been utilized to initially reduce water content, only infrequent mixing is required to effect tinier evaporation and keep the material temperature below 120° F. Preferably, such treatment and evaporation maintains a temperature between about 90° F. and about 110° F. Evaporation, lower water content and temperatures in the ranges indicated are indicative of inhibited thermophilic microbiological activity, decreased decomposition, and maintenance of nitrogen content. Various mechanisms and/or commercially-available equipment can be used with this aspect of the present invention. Apparatus described in the prior art can be used, with modifications as necessary to meet the parameters stated herein. Alternatively, with ample space, the manure can simply, but effectively, be spread and cultivated or mined several times per day. Preferably, the moisture content is reduced below 40 weight percent. In highly preferred embodiments, such treatment, cultivation and/or evaporation serves to inhibit microbiological activity.

The manure material can then be maintained under non-aerobic conditions. Water content is further reduced, but not so low as to terminate bacterial presence. Under such near-anaerobic conditions, sufficient bacterial activity is evidenced by an increase in temperature to about 130° F. to about 150° F. The stated moisture content supports microbiological activity sufficient to heat the material, without further degradation of the nitrogen component. Such temperatures can be maintained for a period of about 1–4 days to, at least, partially sterilize the material.

Maintaining the material in this manner can be accomplished by those individuals skilled in the art and made aware of this invention, using various techniques and/or equipment commercially available. However, as a matter of economy and with minimal investment, the material can be maintained to meet the stated parameters by stacking for the time period indicated. The mass of manure has a sufficient heat capacity to maintain the heat generated. The stated moisture content supports sufficient bacterial activity to fire the material, without composting which would unnecessarily drive down the nitrogen content.

The resulting fertilizer composition can be utilized without further treatment. Alternatively and without limitation, the composition can be molded into pellet form. Equipment necessary to effect such a transformation is commercially available and well known to those skilled in the art. For instance, a California pellet mill can be utilized, as can the apparatus described in U.S. Pat. No. 4,813,996, the entirety of which is incorporated herein by reference. For purposes of example, the California pellet mill apparatus can be used to illustrate various considerations which can be incorporated into the practice of this invention. The moisture content of the fertilizer compositions should not be so high as to cause the roll shells to slip on the die. High moisture content will also cause a screening auger component or a similar such device to malfunction. Typically, such equipment is operated so as to subject the composition to a temperature of about 350° F. to about 550° F., a temperature which deactivates weed seed and pathogens and sterilizes the composition. Such temperatures can be used with pressures of 2,000–2,500 pounds per square inch to pelletize the composition. Again, moisture is a factor. If the water content is too low, higher pressures are required. If the water content is too high, lower pressures are required, but pellet formation is somewhat less than optional. The pressure is preferably sufficient to provide for the breakdown of cellular walls and further enhancement of the slow-release of the stabilized nitrogen component. The pressure and temperature components of such a molding process further sterilize the fertilizer composition and reduce the moisture content to the levels indicated. Reference is made to the examples below for additional information regarding use of a California pellet mill in conjunction with this invention.

The fertilizer composition molded in such a manner should be stored appropriately to provide maximum benefit. Appropriate storage conditions are those which provide an atmosphere with a relative humidity between about 75%–80%. Qualitatively, such conditions are met if the pellets do not acquire a "sweating" appearance after a period of storage. Maintenance of such conditions over a several-week period can further reduce the moisture content to less than about 11 weight percent. Various storage/equipment configurations can be utilized. In particular, a level storage area over a series of drying tubes equipped with blowers to the outside of the storage facility can be used with good effect. Preferably, such a configuration utilizes a three-phase 440 volt motor with a humidistat-controlled blower. Continued monitoring of moisture conditions and pellet temperature can also be used to prevent any bacteria-induced degradation.

EXAMPLES OF THE INVENTION

The following non-limiting examples and data illustrate various aspects and features relating to the inventive methods and resulting compositions. The high nitrogen content and slow release thereof is surprising and unexpected, as compared to methods and compositions of the prior art.

Examples 1-3 provide data and information attesting to the utility of the present invention, as illustrated by a representative embodiment of a dried poultry fertilizer composition available under the Creekwood trademark and having a nitrogen content of about 3 weight percent. Similar and/or enhanced results are obtainable through use of other embodiments having high nitrogen levels of the type described herein, whether in the turf or nursery/horticultural contexts or more broadly in an agricultural setting.

Example 1

The inventive fertilizer, prepared as described herein, was applied on both Kentucky blue grass and creeping bentgrass at a rate of 1.0 pounds of nitrogen per 1,000 cubic feet. Test plots were color rated twice each week over a period of three months, with bluegrass clipping rates determined once per week during the same period. Comparative testing of this invention with other commercial fertilizer products was conducted by a midwestern university, and is summarized in Tables 1 and 2. Various other commercial products are listed by their tradenames and N-P-K concentrations, and are otherwise as described below.

Average color ratings for the Kentucky bluegrass, the percent time color was satisfactory (ratings of 7 to 8), and weekly average clipping weights are presented in Table 1. These three parameters were combined to arrive at an overall numerical rating for each fertilizer and the fertilizers ranked accordingly. These rankings appear in Table 1 as "performance" ratings.

Season average color ratings ranged from 6.71 to 7.72 (Table 1). The lowest value was for sewage sludge. This product should not be confused with the Milorganite product, which is an activated sewage sludge. Inactivated sewage sludges typically release only about 35% of their nitrogen the year of application. This accounts for the notably poor performance of the product tested.

Amendment of organic fertilizers with urea had variable effects on turfgrass responses and fertilizer performance ratings (Table 1). Fortifying poultry compost (Creekwood 3-4-3) with urea actually proved to be somewhat detrimental. The reason is that urea, in the presence of the near-neutral pH of the poultry manure compost, its relatively high moisture content and very high level of microbial activity, underwent rapid hydrolysis and free ammonia was lost to the atmosphere. The amount of ammonia released was sufficient to create burn spots in the creeping bentgrass.

Fortifying the sewage sludge with urea understandably improved turfgrass color ratings but did little to improve performance ratings (Table 1). Adding urea to the Milorganite product likewise failed to alter performance ratings. In contrast, the 1:2 ratio of Hynite product to urea received the highest performance rating of all the fertilizers applied to the Kentucky bluegrass.

Indications were that resin-coated urea (Poly-On) fertilizer is a better product than sulfur-coated urea (SCU) (Table 1), at least for the SCU tested. Responses and performance ratings for the Nutralene and SCU products were improved when incorporated into certain blends to provide a complete grade fertilizer.

Creeping bentgrass responses to the fertilizers are shown in Table 2. Clipping weights were not determined, so the performance ratings are based only on season average color and percent time that color was satisfactory. In several instances, the performance ratings with Kentucky bluegrass (Table 1) and with creeping bentgrass (Table 2) are quite different. Several considerations may provide explanation. One is the fact that the bentgrass trial was terminated at the end of August rather than October. This introduced a bias against those fertilizers that have superior cool weather response characteristics. The other reason is the fact that many of the fertilizers are not intended for use on bentgrass mowed at ½ inch or less. Even though baskets were left off the mower the first week after each fertilizer application, substantial amounts of pickup occurred. This was particularly true for products such as the Creekwood and Poly-On products.

TABLE 1

Kentucky bluegrass responses

|  | Average color rating | % Time color = 7 to 8 | Average clipping weight* | Performance rating** |
|---|---|---|---|---|
| Sludge 4-3-0 | 6.71 | 30 | 0.86 | 34 |
| Creekwood 3-4-3 | 7.72 | 79 | 1.99 | 9 |
| 3-4-3 + Kelpak | 7.53 | 78 | 2.14 | 22 |
| Hynite 11-0-0 | 7.72 | 65 | 2.43 | 32 |
| Milorganite 6-2-0 | 7.34 | 67 | 1.80 | 29 |
| Poultry + urea 1:2 | 7.68 | 63 | 1.96 | 31 |
| Poultry + urea 2:1 | 7.67 | 79 | 2.57 | 25 |
| Sludge + urea 1:2 | 7.57 | 84 | 2.77 | 20 |
| Sludge + urea 2:1 | 7.48 | 77 | 2.86 | 27 |
| Milorganite + urea 1:2 | 7.26 | 74 | 2.36 | 28 |
| Milorganite + urea 2:1 | 7.07 | 79 | 1.79 | 23 |
| Hynite + urea 1:2 | 7.56 | 91 | 1.86 | 1 |
| Hynite + urea 2:1 | 7.68 | 77 | 2.02 | 17 |
| SV 25-2-4 | 7.61 | 79 | 2.20 | 19 |
| 24-1-4 | 7.69 | 81 | 2.27 | 13 |
| 22-1-5 | 7.59 | 86 | 2.29 | 7 |
| 7-1-4 + 14 oz Hydro-Wet | 7.58 | 81 | 2.64 | 24 |
| 7-1-4 + 7 oz Hydro-Wet | 7.47 | 86 | 2.63 | 16 |

TABLE 1-continued

Kentucky bluegrass responses

| | Average color rating | % Time color = 7 to 8 | Average clipping weight* | Performance rating** |
|---|---|---|---|---|
| 7-1-4 + 3.5 oz Hydro-Wet | 7.50 | 84 | 2.57 | 18 |
| Sustane 5-2-4 | 7.09 | 72 | 1.89 | 26 |
| Naturall 8-1-3 | 7.36 | 91 | 2.25 | 3 |
| Lawn Fixer 9-2-1 | 7.23 | 88 | 2.46 | 12 |
| Poly-On 43-0-0 | 7.70 | 81 | 1.66 | 4 |
| Nutralene 40-0-0 | 7.35 | 77 | 1.46 | 11 |
| SCU 38-0-0 | 7.74 | 63 | 1.95 | 30 |
| 25-2-8 ¼ Poly-On | 7.60 | 88 | 2.10 | 2 |
| 25-2-8 ½ Poly-On | 7.44 | 81 | 2.06 | 14 |
| 25-2-8 ¾ Poly-On | 7.39 | 88 | 2.19 | 6 |
| 25-2-8 ¼ Nutralene | 7.44 | 91 | 2.46 | 5 |
| 25-2-8 ½ Nutralene | 7.33 | 84 | 2.54 | 21 |
| 25-2-8 ¾ Nutralene | 7.45 | 88 | 2.50 | 8 |
| 25-2-8 ¼ SCU | 7.42 | 86 | 2.56 | 15 |
| 25-2-8 ½ SCU | 7.24 | 88 | 2.42 | 10 |
| 25-2-8 ¾ SCU | 7.02 | 65 | 1.93 | 33 |

*Dry weight (g/8.5 ft$^2$) from May 28 through August 26.
**Rank (high to low) based on the numerical value = (color rating) + (0.1) (% time color = 7 to 8) − (clipping weight)

TABLE 2

Creeping bentgrass responses

| | Average color rating | % Time color = 7 to 8 | Performance rating* |
|---|---|---|---|
| Sludge 4-3-0 | 6.60 | 38 | 29 |
| Creekwood 3-4-3 | 7.50 | 85 | 12 |
| 3-4-3 + Kelpak | 7.43 | 92 | 2 |
| Hynite 11-0-0 | 7.68 | 81 | 14 |
| Milorganite 6-2-0 | 7.31 | 77 | 24 |
| Poultry + urea 1:2 | 7.56 | 88 | 6 |
| Poultry + urea 2:1 | 7.56 | 77 | 23 |
| Sludge + urea 1:2 | 7.69 | 77 | 21 |
| Sludge + urea 2:1 | 7.63 | 85 | 9 |
| Milorganite + urea 1:2 | 7.38 | 81 | 20 |
| Milorganite + urea 2:1 | 7.23 | 69 | 26 |
| Hynite + urea 1:2 | 7.23 | 88 | 11 |
| Hynite + urea 2:1 | 7.27 | 85 | 15 |
| SV 25-2-4 | 7.47 | 88 | 7 |
| 24-1-4 | 7.32 | 88 | 9 |
| 22-1-5 | 7.42 | 88 | 8 |
| 7-1-4 + 14 oz Hydro-Wet | 7.36 | 81 | 21 |
| 7-1-4 + 7 oz Hydro-Wet | 7.33 | 96 | 1 |
| 7-1-4 + 3.5 oz Hydro-Wet | 7.23 | 85 | 16 |
| Sustane 5-2-4 | 7.04 | 69 | 27 |
| Naturall 8-1-3 | 7.26 | 88 | 10 |
| Lawn Fixer 9-2-1 | 7.31 | 92 | 3 |
| Poly-On 43-0-0 | 7.12 | 88 | 13 |
| Nutralene 40-0-0 | 7.04 | 65 | 28 |
| SCU 38-0-0 | 7.21 | 85 | 16 |
| 25-2-8 ¼ Poly-On | 7.27 | 92 | 4 |
| 25-2-8 ½ Poly-On | 7.12 | 73 | 25 |
| 25-2-8 ¾ Poly-On | 7.25 | 92 | 5 |
| 25-2-8 ¼ Nutralene | 7.19 | 88 | 12 |
| 25-2-8 ½ Nutralene | 7.11 | 85 | 19 |
| 25-2-8 ¾ Nutralene | 7.25 | 92 | 5 |
| 25-2-8 ¼ SCU | 7.31 | 96 | 1 |
| 25-2-8 ½ SCU | 7.15 | 85 | 17 |
| 25-2-8 ¾ SCU | 7.12 | 85 | 18 |

*Rank based on the numerical value = (color rating) + (0.1) (% time color = 7 to 8)

Example 2

Season average turfgrass color ratings do not necessarily correlate with color responses over time. Such considerations obscure the rate of turfgrass greenup after fertilizers are applied and the duration of color responses. Plots of color responses for the first application of several of the organic fertilizers are shown in the FIGS. 1A–E. The Creekwood, Naturall and Lawn Fixer products were outstanding in terms of initial color development. The Creekwood product then provided excessive color (ratings above 8) for 10 to 20 days after application before providing a good level of uniform color for an additional 20 to 25 days. Long-term color responses to the Milorganite, Lawn Fixer, and Sustane products were generally fairly uniform but relatively low. The Sustane and Lawn Fixer products did not release nitrogen fast enough to prevent turfgrass color from dropping below the minimally acceptable level of 7.0 on several occasions. The Naturall product was the only one among these five organic fertilizers that provided color ratings that were satisfactory throughout the period of May 28 to July 7.

Example 3

Figure 2B:
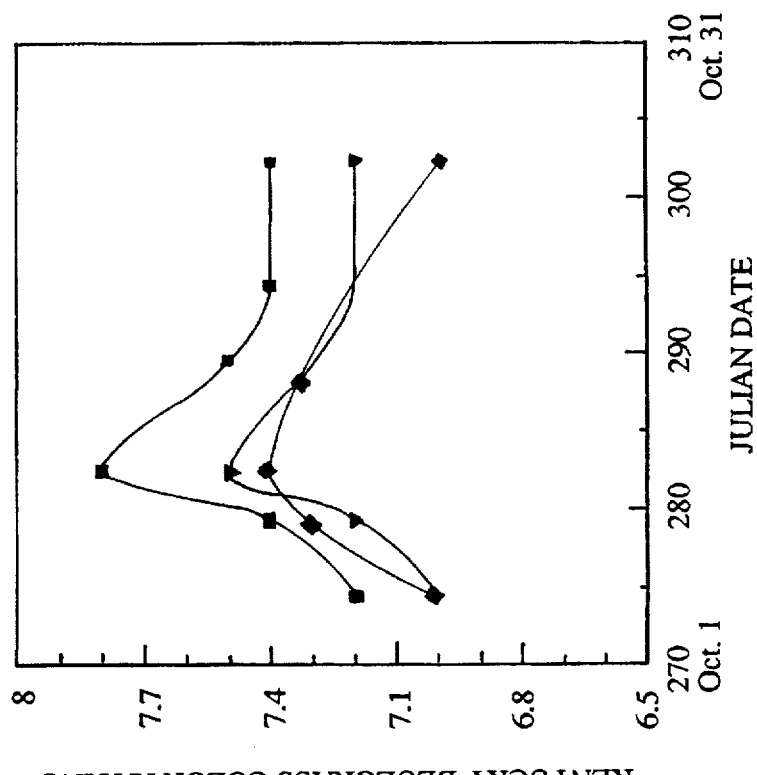
FIGS. 2A and 2B compare late season nitrogen release, as evaluated by widely used Kentucky bluegrass color ratings: Creekwood 3-4-3, Ø; Lawn Fixer, ☐; Milorganite, /; Sustane, Δ; Naturall, ◇; Poly-On, ■; Nutralene, ▼; and SCU ◆.
Figure 2A:
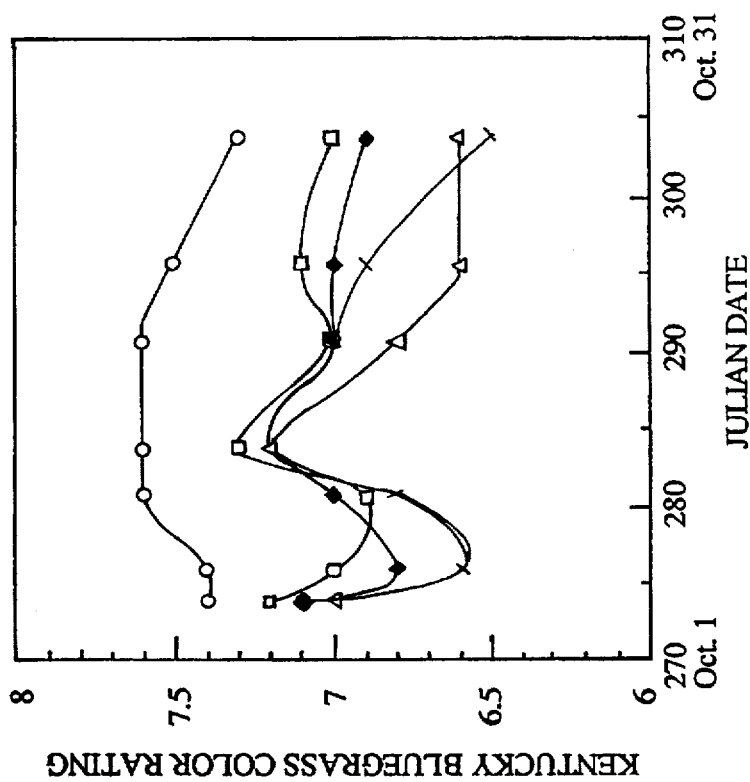

A concern with organic fertilizers is the rate of nitrogen release late in the season when low temperatures suppress microbial activity. In the study conducted, this low temperature suppression appeared to be quite variable. With reference to FIGS. 2A and 2B, Kentucky bluegrass color ratings for the month of October (FIG. 2) imply that nitrogen release from the Milorganite and Sustane products is more temperature sensitive than release from the Lawn Fixer and Naturall products and, in turn, these two fertilizers supply less nitrogen during late season than does the Creekwood product. In fact, late October color ratings for the Creekwood fertilizer were comparable to those for the Poly-On product and exceeded the color responses to the Nutralene and SCU products. While the observations made may be site-specific, the Creekwood product prepared according to this invention showed unique properties among the organic nitrogen fertilizers tested.

The Examples 4–8 are presented with reference to another fertilizer composition, a representative embodiment of this invention, prepared as described herein and having a macronutrient profile as provided below in Example 4. Excellent results from this embodiment, and other embodiments of the invention having a high stabilized nitrogen level, are achievable when used as provided in Examples 5–8.

Example 4

| Total Nitrogen | 4.0% |
|---|---|
| Available Phosphoric Acid (P$_2$O$_5$) | 5.0% |
| Soluble Potash (K$_2$O) | 3.0% |
| Calcium (Ca) | 8.0% |

Example 5

Lawns: Apply fertilizer uniformly every 10 weeks at the rate of 20 lbs. per 1,250 sq. ft. Use a broadcast spreader (spinner type) set at wide open, or if using a drop spreader, consult your owner's manual for the correct setting. For established lawns four applications per year are recommended. For new lawns and sod apply fertilizer to soil at the rate of 30 lbs. per 1,000 sq. ft. prior to seeding. Work into the soil to a depth of 1 to 2 inches. Seed or sod immediately. Reapply every 10 weeks at 20 lbs. per 1,250 sq. It is not necessary to water, however applying water will activate fertilizer and faster results can be achieved.

Example 6

Flowers and vegetable gardens: For perennials, apply fertilizer early in the spring and again after plants have bloomed to give plants strength for the following season. Apply 1 lb. per 100 sq. ft. to base of plants and rake lightly into soil. For annuals, apply fertilizer at the time of planting at the rate of 2 lbs. per 100 sq. ft. of seed bed and work into the soil. When flower buds have formed, reapply at 1 lb. per 100 sq. ft. and rake lightly into soil.

Example 7

Shrubs: For single shrub plantings, the amount to use will depend somewhat upon the size of the shrub. For new shrub beds, apply fertilizer into the soil at the rate of 2 lbs. per 100 sq. ft. and work thoroughly into the soil before planting. For established shrub beds, apply fertilizer around the base of the plant and scratch lightly into the soil, using one cup for each plant. Apply, optimally, twice per year.

Example 8

Trees: Apply fertilizer once each year in the spring. Depending on the size of the tree, use 3 lbs. of fertilizer for each inch of mink diameter measured at chest height. (A small tree with a 4 inch diameter trunk will require about 12 lbs. of fertilizer.) Pour fertilizer to within 4 in. of top of 1 in. diameter holes, 12 to 15 in. deep, spaced 2 ft. apart spreading from tree trunk to outer edge of branches. Cover with soil.

Example 9

A California pellet mill apparatus can be operated with a 150 H.P. motor, above or in conjunction with an AMP meter and/or an hour meter. The die is driven by the 150 H.P. motor. Two rollers are installed 180° from each other and are adjustable. Adjustments can be made to determine the amount of pressure along with the volume of material a die will take. The rollers should have no metal to metal contact with the die. The rollers can be closed end fluted. Dimpled and open end fluted can also be used. When adjusting the rollers, initial setting should be such that a space appears between the roller and the die. The composition is slowly fed into the mill. Adjust the feed auger speed to achieve approximately 120 AMPS. A proper roller adjustment is shown by a blanket of manure between 1/32" and 1/16" on the die. Adjustment to increase or decrease roller pressure can control the amount of manure observed. A pellet cooler having an apron, an adjustable speed drive, and equipped with a large fan can be utilized. Air is pulled in below the bed of pellets, through the pellets, cooling them and removing moisture.

While the principles of this invention have been described in connection with specific embodiments, it should be understood clearly that these descriptions, along with the chosen Tables and data therein are made only by way of example, and are not intended to limit the scope of this invention, in any manner. For example, the fertilizer compositions can be prepared using various poultry manure materials. The performance properties observed are not limited to those disclosed. It should be understood that the data presented is only representative of the benefits and advantages which can be realized through the use of such methods and their resulting compositions. Likewise, while certain fertilizer compositions can be prepared with reference to a specific method embodiment or one or more specific process parameters—including temperature and pressure—it is understood that such parameters and others inferred from this description can be readily changed for the purpose of optimizing performance. Other advantages and features of the invention will become apparent from the following claims, with the scope thereof determined by the reasonable equivalents, as understood by those skilled in the art.

I claim:

1. A method of preparing a dried fertilizer composition from poultry manure, said method comprising:
   providing excremented poultry manure;
   aerating said manure at a rate and for a time sufficient to achieve a total nitrogen content of about 7.0 to about 8.5 percent by weight of said manure;
   cultivating said manure to reduce the moisture content to about 20 to about 45 percent by weight of said manure; and
   maintaining said manure for a time and at a temperature sufficient to sterilize said manure and achieve a total nitrogen content of about 3.0 to about 7.0 percent by weight of said manure.

2. The method of claim 1 wherein said aeration is at a rate of about 400–800 cubic feet per minute.

3. The method of claim 1 wherein said aeration is at a rate of about 4 cubic feet per minute per bird.

4. The method of claim 1 wherein said manure is cultivated at a temperature of about 90° F. to about 120° F.

5. The method of claim 1 wherein said manure is maintained at a temperature of about 130° F. to about 150° F.

6. The method of claim 5 wherein said temperature is maintained for a period of about 24 hours to about 168 hours.

7. The method of claim 1 further including molding said maintained manure.

8. The method of claim 7 wherein said molding is at a temperature and pressure sufficient to provide said manure a moisture content of about 15.0 weight percent to about 26.0 weight percent of said manure.

9. A dried poultry manure based fertilizer composition with a total nitrogen content of about 3.0 weight percent to about 7.0 weight percent, said composition produced by aerating freshly excremented poultry manure at a rate of about 400 cubic feet per minute to about 800 cubic feet per minute for a period of about two days to about four days, cultivating said manure at an ambient temperature of about 75° F. to about 120° F., and maintaining said manure at a temperature sufficient to deactivate residual weed seeds and pathogens.

10. The fertilizer composition of claim 9 wherein said aeration is at a rate of about 600 cubic feet per minute.

11. The method of preparing a molded fertilizer product, comprising:
    providing freshly excremented poultry manure;
    aerating said manure at a rate and for a time sufficient to achieve a total nitrogen content of about 7.0 to about 8.5 percent by weight of said manure;
    cultivating said manure to reduce the moisture content to about 20 to about 45 percent by weight of said manure;
    maintaining said manure for a time and at a temperature sufficient to sterilize said manure and achieve a total nitrogen content of about 3.0 to about 7.0 percent by weight of said manure; and
    molding said manure at a temperature and pressure sufficient to reduce the moisture content of said manure to about 15.0 weight percent to about 26.0 weight percent.

12. The method of claim 11 wherein said aeration is at a rate of about 400–800 cubic feet per minute.

13. The method of claim 11 wherein said aeration is at a rate of about 4 cubic feet per minute per bird.

14. The method of claim 11 wherein said manure is cultivated at a temperature of about 90° F. to about 120° F.

15. The method of claim 11 whereto said manure is maintained at a temperature of about 130° F. to about 150° F.

16. The method of claim 15 wherein said temperature is maintained for a period of about 24 to about 168 hours.

17. The method of claim 11 whereto said molding is at a temperature of about 350° F. to about 550° F.

18. The method of claim 17 wherein said molding is at a pressure of about 2,000 pounds per square inch to about 2,500 pounds per square inch.

19. A dried poultry manure based fertilizer composition having a total nitrogen content of about 3.0 weight percent to about 7.0 weight percent and providing a late season Kentucky blue grass color rating of about 7.5 after an application equivalent to 1.0 pound of nitrogen per 1,000 square feet of turf, said composition produced by aerating freshly excremented poultry manure at a rate of about 400 cubic feet per minute to about 800 cubic feet per minute for a period of about two days to about four days, cultivating said manure at an ambient temperature of about 75° F. to about 120° F., and maintaining said manure at a temperature sufficient to deactivate residual weed seeds and pathogens.

20. The fertilizer composition of claim 19 further produced by molding said maintained manure.

21. A method of controlling the rate of release of a nitrogen component of a poultry manure based fertilizer, said method comprising:

(a) providing a freshly excremented poultry manure;

(b) fixing the nitrogen component of said manure by
   (i) aerating said manure at a rate and for a time sufficient to achieve a total nitrogen content of about 7.0 to about 8.5 percent by weight of said manure,
   (ii) cultivating said manure to reduce the moisture content to about 20 to about 45 percent by weight of said manure, and
   (iii) maintaining said manure for a time and at a temperature sufficient to sterilize said manure and achieve a total nitrogen content of about 3.0 to about 7.0 percent by weight of said manure; and (c) introducing said maintained manure to a growth medium, whereby under indigenous conditions the nitrogen component of said maintained manure is made available for plant growth and development.

22. The method of claim 21 further including molding said maintained manure at a temperature and pressure sufficient to reduce the moisture content of said manure to about 15.0 to about 26.0 weight percent.

* * * * *